United States Patent
Zhai et al.

(10) Patent No.: US 10,921,625 B1
(45) Date of Patent: Feb. 16, 2021

(54) DISPLAY MODULE AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Yue Zhai, Beijing (CN); Shouyang Leng, Beijing (CN); Rui Han, Beijing (CN); Zhipeng Zhang, Beijing (CN); Zeyuan Tong, Beijing (CN); Dong Cui, Beijing (CN); Wenyang Li, Beijing (CN); Zan Zhang, Beijing (CN); Weining Chi, Beijing (CN); Fengping Wang, Beijing (CN); Rui Tan, Beijing (CN); Qing Ma, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/814,617

(22) Filed: Mar. 10, 2020

(30) Foreign Application Priority Data

Oct. 30, 2019  (CN) .......................... 20111048098.7

(51) Int. Cl.
  *G02F 1/1333* (2006.01)
  *G06F 1/16* (2006.01)
  *B60K 35/00* (2006.01)

(52) U.S. Cl.
  CPC ........ *G02F 1/133308* (2013.01); *B60K 35/00* (2013.01); *G02F 1/133305* (2013.01); *G06F 1/1609* (2013.01); *B60K 2370/1523* (2019.05); *B60K 2370/1533* (2019.05); *G02F 2001/133314* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 8,437,120 | B2 * | 5/2013 | Lee ..................... | H05K 5/0217 361/679.01 |
| 8,724,044 | B2 * | 5/2014 | Chen .................... | H05K 1/0215 349/58 |
| 8,780,543 | B2 * | 7/2014 | Molne ............... | G02F 1/133526 361/679.21 |
| 8,873,228 | B2 * | 10/2014 | Kuo .................. | G02F 1/133308 361/679.21 |

(Continued)

*Primary Examiner* — Lisa Lea-Edmonds
(74) *Attorney, Agent, or Firm* — Thomas|Horstemeyer, LLP (57) ABSTRACT

The present application relates to the field of display technology and, in particular, to a display module and a display device. The display module comprises a backplane comprising a bottom plate and a side frame disposed on the bottom plate; a display assembly located in the side frame, the display assembly comprising a light source; a support member located on a side frame away from the bottom plate, where the support member is detachably connected to the side frame; and a cover plate located on the side of the support member facing away from the side frame, and the cover plate being bonded to the support member. This solution can solve the problem that the module is difficult to disassemble, so as to reduce the maintenance cost.

14 Claims, 3 Drawing Sheets

(56) References Cited

U.S. PATENT DOCUMENTS

| | | | | |
|---|---|---|---|---|
| 9,122,099 B2* | 9/2015 | Li | ............... | G02F 1/133308 |
| 9,354,663 B2* | 5/2016 | Lin | ............... | G06F 1/1637 |
| 9,429,793 B2* | 8/2016 | Chen | ............... | G02F 1/133308 |
| 9,494,812 B1* | 11/2016 | Zhou | ............... | G02B 6/0088 |
| 9,904,085 B2* | 2/2018 | Zhao | ............... | G02F 1/133308 |
| 10,502,997 B2* | 12/2019 | Chen | ............... | G02F 1/13338 |
| 10,557,985 B2* | 2/2020 | Chen | ............... | G02B 6/0073 |
| 2008/0266771 A1* | 10/2008 | Huang | ............... | H05K 5/02 |
| | | | | 361/679.02 |
| 2011/0164362 A1* | 7/2011 | Huang | ............... | H05K 5/02 |
| | | | | 361/679.01 |
| 2013/0258237 A1* | 10/2013 | Zhang | ............... | B29C 45/00 |
| | | | | 349/60 |
| 2013/0286319 A1* | 10/2013 | Kuo | ............... | G02F 1/133308 |
| | | | | 349/58 |
| 2013/0286321 A1* | 10/2013 | Kuo | ............... | G02F 1/133308 |
| | | | | 349/58 |
| 2013/0286322 A1* | 10/2013 | Kuo | ............... | G02F 1/133308 |
| | | | | 349/58 |
| 2014/0204306 A1* | 7/2014 | Li | ............... | G02F 1/133308 |
| | | | | 349/58 |

* cited by examiner

DISPLAY MODULE AND DISPLAY DEVICE

CROSS REFERENCE TO RELATED APPLICATION

This application is based upon, and claims the benefit of and priority to Chinese Patent Application No. 201911048098.7, filed on Oct. 30, 2019, the entire contents thereof being incorporated herein by reference.

TECHNICAL FIELD

The present application relates to the field of display technology and, in particular, to a display module and a display device.

BACKGROUND

With the rapid development of liquid crystal display technology, liquid crystal display modules are increasingly used in various technical fields. For example, they can be used in display devices, such as televisions, vehicle meters, and the like. The liquid crystal display module is a main part of the display, and includes a frame, a liquid crystal panel, and a backlight. In a conventional display module, a cover plate and a frame contact with and are fixed on the liquid crystal panel, which makes it difficult to disassemble the entire module.

It should be noted that the information disclosed in the background section above is only used to enhance the understanding of the background of the present application, and therefore may include information that does not constitute the prior art known to those skilled in the art.

SUMMARY

The purpose of this application is to provide a display module and a display device, which solves the problem that the module is difficult to disassemble, so as to reduce the maintenance cost.

A first aspect of the present application provides a display module, including:

a backplane comprising a bottom plate and a side frame provided on the bottom plate;

a display assembly located in the side frame and comprising a display panel;

a support member located on a side of the side frame facing away from the bottom plate and detachably connected to the side frame;

a cover plate located on a side of the support member facing away from the side frame and bonded to the support member.

In an exemplary embodiment in the present application, the side frame comprises an extension portion provided outwardly, and the support member is detachably connected to the extension portion.

In an exemplary embodiment in the present application, the support member and the extension portion are connected by a bolt.

In an exemplary embodiment in the present application, a surface of the extension portion opposite to the support member is provided with a first mounting hole, and a surface of the support member opposite to the extension portion is provided with a second mounting hole, and the bolt passes through the first mounting hole and the second mounting hole respectively to connect the extension portion with the support member.

In an exemplary embodiment in the present application: a protrusion is provided on the surface of the extension portion opposite to the support member, and the support member is provided with a recess matching with the protrusion, and the protrusion is provided with a third mounting hole in a direction toward the display assembly, and an outer surface of the support member is provided with a fourth mounting hole, and the bolt passes through the fourth mounting hole and the third mounting hole respectively to connect the support member with the protrusion.

In an exemplary embodiment in the present application: the display module further comprises a circuit board, and the circuit board is disposed on a side of the bottom plate facing away from the display assembly, and the circuit board and the display assembly are connected through at least one flexible conductive member.

In an exemplary embodiment in the present application: the extension portion is provided with a first avoidance groove, and the support member is provided with a second avoidance groove, and an opening of the first avoidance groove faces an outside of the extension portion, and an opening of the second avoidance hole faces an inside of the support member.

In an exemplary embodiment in the present application: the display module is curved.

In an exemplary embodiment in the present application: the display panel and the cover plate are connected through a first bonding layer, and the cover plate and the support member are connected through a second bonding layer.

In an exemplary embodiment in the present application: the display assembly comprises a touch panel located between the display panel and the cover plate and attached to the display panel and the cover plate respectively by bonding.

In an exemplary embodiment in the present application: the first bonding layer is a liquid colloid.

In an exemplary embodiment in the present application: the second bonding layer comprises a first bonding portion and a second bonding portion, and the first bonding portion comprises a solid colloid, and wherein the first bonding portion comprises a first solid glue and a second solid glue, and the first solid glue, the second solid glue, the cover plate and the support member form a receiving cavity; the second bonding portion comprises a liquid colloid and is filled in the receiving cavity.

A second aspect of the present application provides a display device including the display module according to any one of the above.

It should be understood that the above general description and the following detailed description are merely exemplary and explanatory, and should not limit the present application.

BRIEF DESCRIPTION OF THE DRAWINGS

The drawings herein are incorporated in and constitute a part of the specification, illustrate embodiments consistent with the present application, and together with the description serve to explain the principles of the application. Understandably, the drawings in the following description are just some embodiments of the present application. For those of ordinary skill in the art, other drawings can be obtained according to these drawings without creative efforts.

DETAILED DESCRIPTION

Example embodiments will now be described more fully with reference to the accompanying drawings. However, the example embodiments can be implemented in various forms and should not be construed as limited to the embodiments set forth herein. Rather, these embodiments are provided so that this application will be comprehensive and complete, and will fully convey the concepts of the example embodiments to those skilled in the art. The same reference numerals in the drawings denote the same or similar structures, and thus their detailed descriptions will be omitted.

Although relative terms such as "above" and "below" are used in this specification to describe the relative relationship between one component and another component of the icon, these terms are used in this specification for convenience only, for example, according to the direction of an example in the drawings. It can be understood that if the device of the icon is turned upside down, the component described above will become the component below. When a structure is described as "on" another structure, it may mean that a structure is integrally formed on another structure, or that a structure is "directly" arranged on another structure, or that a structure is "indirectly" arranged on another structure through other structures.

Figure 1:
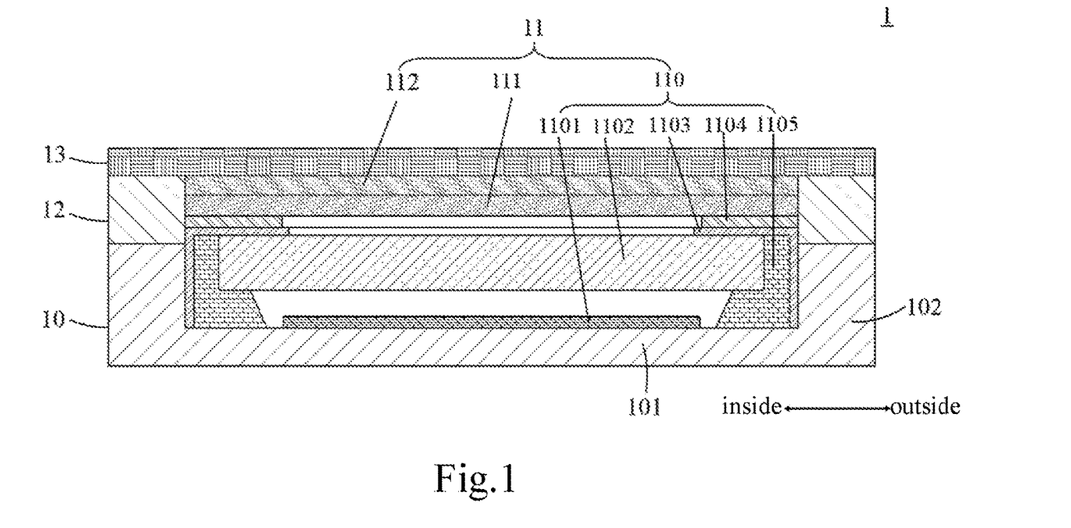
FIG. 1 is a cross-sectional structure schematic view of a display module according to an embodiment of the present application.

An embodiment of the present application provides a display module 1. As shown in FIG. 1, the display module 1 may include a backplane 10, a display assembly 11, a support member 12, and a cover plate 13.

The backplane 10 includes a bottom plate 101 and a side frame 102 disposed on the bottom plate. The side frame 102 may be disposed at an edge of the bottom plate 101. It should be understood that the side frame 102 is annular, and the side frame 102 may form an accommodation space with the bottom plate 101.

Alternatively, the backplane 10 can be made of a metal material, such as an aluminum plate, to ensure the structural strength of the backplane 10, but is not limited to this and can also be made of other materials. When the backplane 10 is made of a metal material, the metal material may be processed by a die casting process to form the backplane 10.

The support member 12 is an annular structure, and is located on a side of the side frame 102 facing away from the bottom plate 101. Also, the support member 12 is detachably connected to the side frame 102. Alternatively, the supporting member 12 can be made of a metal material such as an aluminum plate to ensure its structural strength, but is not limited to this, and it can also be made of other materials. The material of the support member 12 may be the same as or different from the material of the backplane 10. When the support member 12 is made of a metal material, the metal material may be processed by a die casting process to form the support member 12.

The annular structure of the support member 12 may be the same as the annular structure of the side frame 102, that is, the projections of the support member 12 and the side frame 102 perpendicular to the bottom plate 101 are the same. The annular structure may be a rectangular ring, a circular ring, or a special-shaped ring, which is not limited herein. It can be understood that the support member 12 is located above the side frame 102, and the height of the side frame 102 and the bottom plate 101 forming an accommodation space can be increased.

It should be understood that the detachable connection refers to a connection method that can be repeatedly disassembled and has less damage to the connection structure, such as bolt connection, key connection, pin connection, and snap connection. Alternatively, the detachable connection used in this application may be one of the above connection methods or a combination thereof. Corresponding non-detachable connection methods may include riveting, welding, bonding, and the like.

The display assembly 11 is located inside the side frame 102 and is disposed on the bottom plate 101. The display assembly 11 further includes a light source. In some embodiments of the present application, as shown in FIG. 1, for the side frame 102, the direction near the center of the bottom plate 101 is inside, that is, "inside" indicated by the arrow in the figure, and the direction away from the center of the bottom plate 101 is outside, that is, "outside" indicated by the arrow in the figure. It should be understood that the display assembly 11 is installed in an accommodation space formed by the backplane 10 and the support member 12. This display assembly 11 may include a display panel 111. The display panel 111 may be a liquid crystal display, but is not limited thereto. The display assembly 11 has not only a display function, but also a touch function. The display assembly 11 with a touch function may include a touch panel 112 or may not include the touch panel 112 (for example, an In-Cell structure). It should be understood that when the display panel 111 is a liquid crystal display, the display assembly 11 may further include a backlight assembly 110 to provide a light source. The backlight assembly 110 can be mounted on the bottom plate 101 and located on a side of the display panel 111 facing the bottom plate 101. The backlight assembly 110 can be a direct type backlight structure. As shown in FIG. 1, the backlight assembly 110 of the direct type backlight structure may include a light source 1101, an optical film 1102, a lower rubber frame 1105, an upper rubber frame 1103, and foam 1104. The optical film 1102 may include films such as a light guide plate, a diffusion sheet, and a prism sheet. It should be noted that the display assembly 11 shown in FIG. 1 is only a schematic view, and the component composition and shape structure thereof are not limited thereto, and will not be described in detail herein.

The cover plate 13 is located on a side of the support member 12 facing away from the side frame 102, and the cover plate 13 is bonded to the support member 12. It can be understood that the cover plate 13 covers the support member 12, thus an accommodating space formed by the support member 12 and the backplane 10 can be closed. The cover plate 13 and the support member 12 can be bonded together by a bonding substance (not shown in FIG. 1). The bonding substance may include at least one of a liquid colloid or a solid colloid.

Alternatively, the cover plate 13 may be made of a transparent glass material, that is, the cover plate 13 may be a transparent glass plate, but is not limited thereto, and may also be made of other transparent materials.

Since the cover plate 13 is mostly made of glass and the like materials, the structural strength is not high. If the cover plate 13 forms a detachable combination with the side frame 102 directly, the processing is difficult and the cover plate 13 may be easily damaged. In this application, with a three-layer structure formed by adding the support member 12 between the cover plate 13 and the side frame 102, the cover plate 13 is bonded to the support member 12 to ensure the strength of the cover plate and the original assembly process unchanged. The support member 12 is detachably connected to the side frame 102, thereby shielding the impact of frequent disassembly on the upper glass cover plate 13, and ensuring the separation of the cover plate 13 from the backplane 10, which facilitates the repair of the display assembly 11 in the accommodation space after failure. In particular, in order to meet the requirements of high contrast, Mini-Leds are used as backlight sources of display modules in more and more cases. However, this type of light source has a higher price and a higher failure rate. Through the design of this application, it is possible to greatly reduce the cost of disassembly and repair after lamp bead failure.

Figure 2:
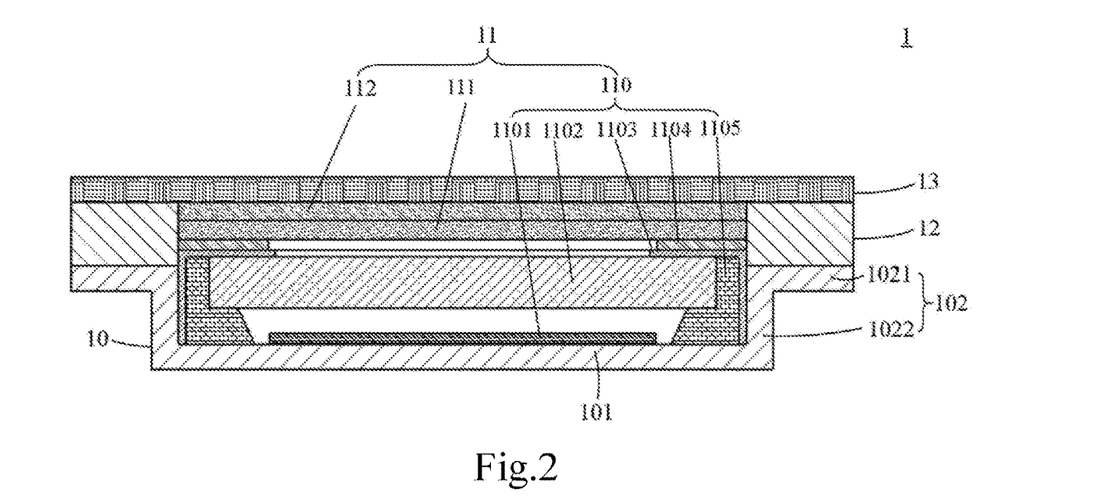
FIG. 2 is a cross-sectional structure schematic view of a display module according to another embodiment of the present application.

In one embodiment, as shown in FIG. 2, the side frame 102 includes an extension portion 1021 disposed outward, and the support member 12 is detachably connected to the extension portion 1021. The side frame 102 may include the extension portion 1021 and a side wall 1022. The side wall 1022 and the bottom plate 101 form an accommodation space, and the extension portion 1021 sufficiently contacts with the support member 12 for receiving the support member 12 and the cover plate 13. On one hand, the accommodating space needs to accommodate a plurality of components of the display assembly 11, so the side frame 102 needs to have a certain thickness in a direction perpendicular to the bottom plate 101 and, on the other hand, in order to ensure that the side frame 102, the support member 12, and the cover plate 13 can sufficiently contact with each other to ensure sufficient connection strength. Therefore, the side frame 102 also needs to have a sufficient width in a direction parallel to the bottom plate 101, which results in a larger volume of the side frame 102. By providing the side frame 102 as the extending portion 1021 and the side wall 1022, the volume of the side frame 102 is reduced and material is saved while ensuring the connection strength and sufficient accommodation space. It should be understood that after the thickness of the extending portion 1021 is smaller than that of the original side frame 102 in the direction perpendicular to the bottom plate 101, it also provides more and more convenient process options for the detachable connection with the support member 12. In addition, when applied to display modules in the automotive field, it is generally necessary to connect and install with other equipment in the car. After the volume of the side frame 102 becomes smaller, a certain space (the space outside the side wall 1022) is left, making the installation in the narrow space of the car becomes more convenient.

The support member 12 and the extension portion 1021 are connected by a bolt. The bolt can connect the support member 12 and the extension portion 1021 in at least one of a direction perpendicular to the bottom plate 101 or a direction parallel to the bottom plate 101. It can be understood that the bolt can connect the support member 12 and the extension portion 1021 in a direction perpendicular to the bottom plate 101, or connect the support member 12 and the extension portion 1021 in a direction parallel to the bottom plate 101, or can be used in both directions at the same time, so as to achieve a detachable connection between the support member 12 and the extension portion 1021. The bolt connection method is convenient for disassembly and the processing is simple. It is only necessary to punch holes in the corresponding components to form threaded holes. There is no need to make too many changes to the structures of the original support member and the bottom plate, and the bolt connection is easy to disassemble. It should be understood that the bolt connection mentioned in the present application refers to a way of connecting components through internal and external threads. A rod portion of the bolt used may be threaded, and may be partially or fully threaded. The end of the rod may be pointed or flat.

Figure 3:
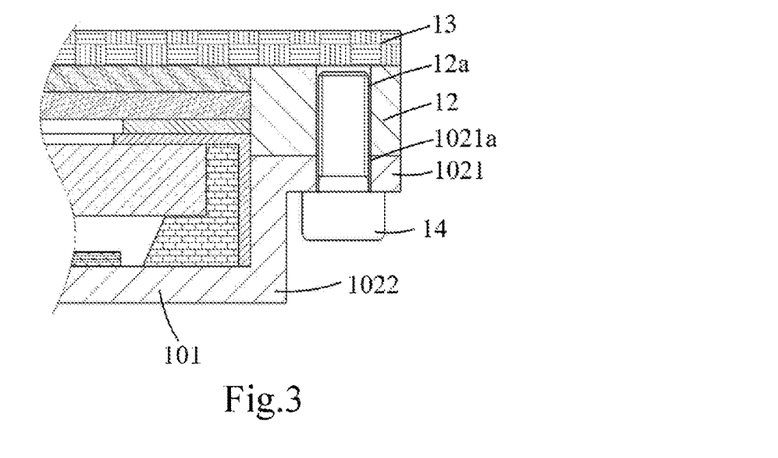
FIG. 3 is a schematic view of a bolted connection structure of a display module according to an embodiment of the present application.

In an embodiment, as shown in FIG. 3, a surface (an upper surface of the extension portion) of the extension portion 1021 opposite to the support member 12 is provided with a first mounting hole 1021*a*, and the first mounting hole 1021*a* is a through hole. A surface (a lower surface of the support member) of the support member 12 opposite to the extension portion 1021 is provided with a second mounting hole 12*a*, and the bolt 14 passes through the first mounting hole 1021*a* and the second mounting hole 12*a* to connect the extension portion 1021 and the support member 12. The second mounting hole 12*a* is a threaded hole, which is matched with the thread of the bolt. Alternatively, the first mounting hole 1021*a* may be an unthreaded hole with a diameter greater than or equal to the external thread diameter of the bolt 14. The first mounting hole 1021*a* may also be a threaded hole with the same diameter as the second mounting hole 12*a*. When the first mounting hole 1021*a* and the second mounting hole 12*a* are both threaded holes, the connection strength of the bolt can be increased. However, when the threaded holes are processed, the backplane 10 and the supporting member 12 need to be punched at the same time to ensure thread continuity. When the first mounting hole 1021*a* is an unthreaded hole, the manufacturing process can be simplified, but the connection strength is reduced. The above solutions can be selected according to actual process requirements, and are not limited herein.

Figure 4:
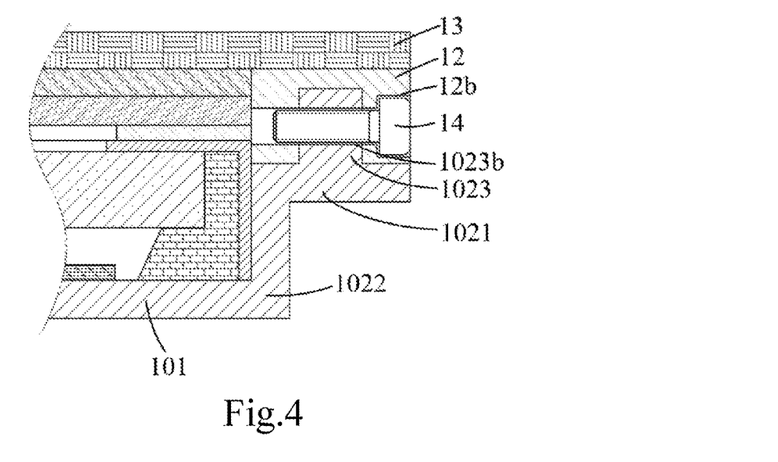
FIG. 4 is a schematic view of a bolted connection structure of a display module according to another embodiment of the present application.

In another embodiment, as shown in FIG. 4, a protrusion 1023 is provided on a surface (the upper surface of the extension portion) of the extension portion 1021 opposite to the support member 12, and the support member 12 is provided with a recess (not shown in the figure) matching with the protrusion 1023. The protrusion 1023 of the extension portion 1021 is provided with a third mounting hole 1023*b* in a direction toward the display assembly 11, and an outer surface of the support member 12 is provided with a fourth mounting hole 12*b*, and the bolt 14 passes through the fourth mounting hole 12*b* and the third mounting hole 1023*b* respectively and connects the support member 12 to the protrusion 1023. Alternatively, the third mounting hole 1023*b* is a through hole, and the fourth mounting hole 12*b* may be a through hole or a hole with a certain depth. Alternatively, the third mounting hole 1023*b* is a threaded hole, and the fourth mounting hole 12b may be a threaded hole or an unthreaded hole. Alternatively, the fourth mounting hole 12b is a countersunk hole, so that the bolt 14 can enter the mounting hole in whole, without increasing the width of the display module 1 in a direction parallel to the bottom plate 101, and protecting the bolt 14 from suffering excessive impact from outside.

By providing the protrusion on the extension portion 1021 and the recess of the support member 12, the positioning and installation of the extension portion 1021 and the support member 12 can be facilitated, and the support member 12 of the annular structure can be more firmly fixed on the backplane 10.

The protrusion 1023 may be provided at any position on a third surface of the extension portion 1021. As shown in FIG. 4, the protrusion 1023 is provided at the center of the third surface of the extension portion 1021. Alternatively, the protrusion 1023 may also be provided on an outer edge or an inner edge of the third surface of the extension portion 1021, which is not limited herein. Alternatively, the protrusion 1023 can be provided on the whole surface of the extension portion 1021 to form a continuous annular protrusion structure, or the protrusions 1023 can be provided on a portion of the surface of the extension portion 1021 to form an intermittent protrusion structure, that is, the protrusion is only provided at a position where a bolt connection is required.

Correspondingly, in another embodiment, a protrusion may be provided on a surface of the support member 12 opposite to the extension portion 1021, and a recess matching with the protrusion may be provided on the extension portion 1021 to achieve a bolt connection between the support member 12 and the extension portion 1021.

It should be understood that although only one bolt is shown in FIGS. 3 and 4, in the embodiment of the present application, the support member 12 and the extension portion 1021 may be provided with multiple sets of mounting holes uniformly or symmetrically around the annular structure. The connection strength of the support member 12 and the extension portion 1021 is ensured through multiple bolt connections. The number and distribution of mounting holes can be set according to actual needs, which is not limited herein.

Figure 5:
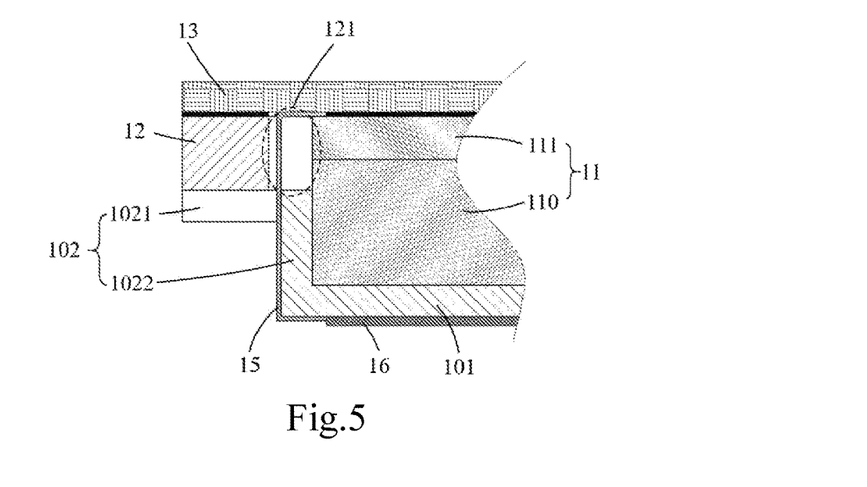
FIG. 5 is a schematic view of a circuit board connection of a display module according to an embodiment of the present application.
Figure 6:
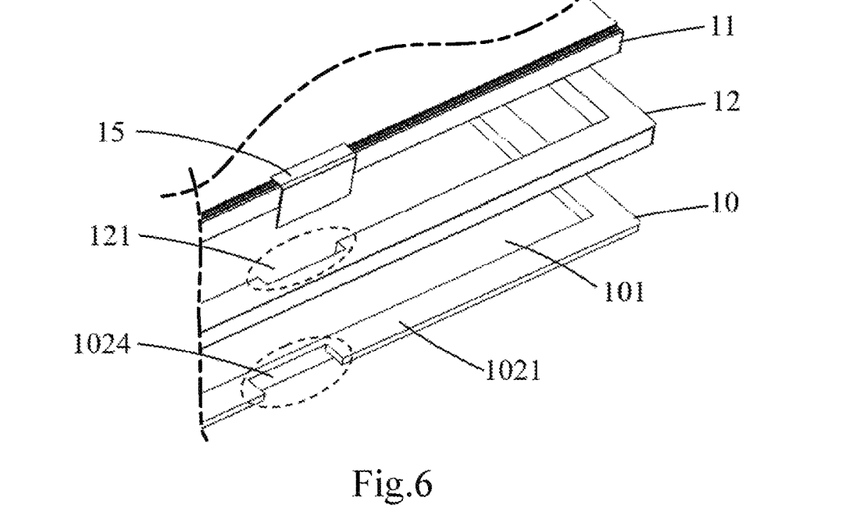
FIG. 6 is an assembly view of various components of a display module according to an embodiment of the present application.

As shown in FIGS. 5 and 6, the display module 1 further includes a circuit board 16, and the circuit board 16 is disposed on a side of the bottom plate 101 facing away from the display assembly 11. The circuit board 16 here may include a printed circuit board (PCB) for controlling and driving the display circuit. Here, the printed circuit board may be a rigid circuit board or a flexible printed circuit (FPC), which may be selected according to actual needs, and is not limited herein. A flexible circuit board is a kind of highly reliable and excellent flexible printed circuit board made of polyimide or polyester film as the substrate. It has high wiring density, light weight, thin thickness, and good bending. Alternatively, the circuit board 16 may be bonded to the bottom plate 101 by an adhesive substance, or the circuit board 16 may be fixed on the bottom plate 101 by a bolt.

The circuit board 16 and the display assembly 11 are connected through at least one flexible conductive member 15. The flexible conductive member 15 here may include a flexible circuit board FPC. The flexible conductive member 15 is connected to the display panel 111 of the display assembly 11 through a bonding process. After the flexible conductive member 15 extends out of the display panel 111, it adheres to an outer sidewall of the side frame 102 and finally bends to a bottom sidewall of the bottom plate 101, and connects to the circuit board 16. Alternatively, the flexible conductive member 15 and the circuit board 16 may both be a flexible circuit board FPC.

It should be understood that although only one flexible conductive member 15 is shown in FIGS. 5 and 6, in the embodiment of the present application, a plurality of flexible conductive members 15 may be bound to one side of the display panel 111. A plurality of flexible conductive members 15 are connected to the circuit board 16. The number of the flexible conductive pieces 15 can be set according to the actual circuit design situation, which is not limited here.

The side frame extension portion 1021 of the backplane 10 is provided with a first avoidance groove 1024, and the support member 12 is provided with a second avoidance groove 121. The first avoidance groove 1024 and the second avoidance groove 121 ensure that the flexible conductive member 15 can be extended out of the display assembly 11, through the support member 12 and the side frame 102 smoothly, and is connected to the circuit board 16.

In the module installation process, the display panel 111, the flexible conductive member 15, and the circuit board 16 are generally bonded and connected to each other as a whole, then placed in the backplane 10 for other assembly processes. The circuit board 16 has a large panel-like structure. In order to realize the installation process of the flexible conductive member 15 and reduce the number of bending times of the flexible conductive member 15, in one embodiment, the first avoidance groove 1024 is a U-shaped groove, and an opening of the first avoidance groove 1024 faces an outside of the extension portion 1021, and the depth of the opening may be flush with an outer surface of the side wall 1022. It can be understood that the first avoidance groove 1024 completely makes a part of the annular structure of the extension portion 1021 appeared a hollowing out situation. The second avoidance groove 121 is also a U-shaped groove. The opening of the second avoidance groove 121 faces the inside of the support member 12. The depth of the opening can be set according to the actual situation, which is not limited herein, but the depth of the opening cannot be too close to the outer sidewall of the support member 12. Otherwise, the strength of the support member 12 at the avoidance groove 121 may be poor or even broken. The support member 12 retains a certain width at the avoidance groove 121, so that the support member 12 and the cover plate 13 can attach to each other better at the second avoidance groove 121. In particular, when the display module is a curved module, the cover plate 13 and the support member 12 are integrally attached, thereby avoiding the local stress concentration of the cover plate 13 by both vacant ends of the side frame 102. In addition, the second avoidance groove 121 of the support member 12 limits the flexible conductive member 15 and prevents the flexible conductive member 15 from curling outwards and causing wrinkles.

In one embodiment, the display module 1 may be curved, that is, the cover plate 13, the display assembly 11, the support member 12, and the side frame 102 in the display module 1 are curved to form a curved display module 1, and can be applied to curved screen display. For example, the curved display module 1 can be applied to a vehicle-mounted display device, such as a vehicle-mounted instrument and a central control display device, but is not limited thereto.

Figure 7:
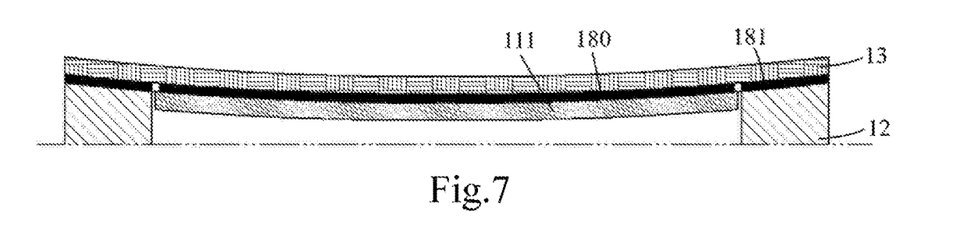
FIG. 7 is a cross-sectional structure schematic view of a display module in a bent state according to an embodiment of the present application.

As shown in FIG. 7, the display panel 111 in the display assembly 11 is curved. The display panel 111 and the cover plate 13 are bonded by a first bonding layer 180 in a planar state to form a flat plate structure. Alternatively, the first bonding layer 180 may be water glue OCR (Optical Clear Resin). An edge portion of the cover plate 13 and the support member 12 are bonded by a second bonding layer 181, so that the display panel 111, the cover plate 13 and the support member 12 form an integrated structure. The integrated structure is cold-formed into a curved shape. This design can ensure that the curvatures of the display panel 111, the cover plate 13, and the support member 12 are the same, and it can also ensure that attachment yield and stability of the display panel 111, the cover plate 13, and the support member 12, which can reduce the problem of Mura caused by flatness. In addition, this structure and attachment solution can make the display panel 111 only be subjected to the bending stress itself and the colloidal stress directly in contact with the bonding material, thereby avoiding the contact stress of the upper iron frame and foam of the traditional curved module on the display panel 111.

Figure 8:
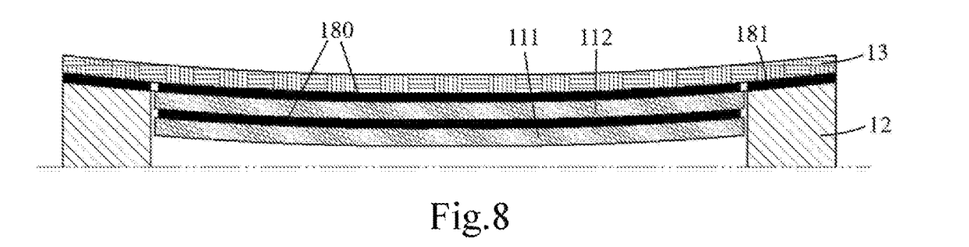
FIG. 8 is a cross-sectional structure schematic view of a display module in a bent state according to another embodiment of the present application.

In another embodiment, as shown in FIG. 8, the display assembly 11 further includes a touch panel 112. The touch panel 112 is located between the display panel 111 and the cover plate 13 and is attached to the display panel 111 and the cover plate 13 respectively in a bonding method, and after forming a flat plate structure, similarly, the above method is used to attach the flat plate structure to the support member 12 such as to form an integrated structure, and the cold bending process is used to implement the assembly of a curved touch screen.

Alternatively, the touch panel 112 and the display panel 111 may be attached to the cover plate 13 using a water glue OCR in a full attached method to form a flat plate structure. Compared with a frame attached method, the full attached method does not allow air to enter between the connected components, and therefore, the influence of air on the display effect can be avoided.

In addition, in this embodiment, the flat plate structure formed by the display panel 111, the touch panel 112, and the cover plate 13 is bent by a cold bending method to facilitate processing the flat plate structure into a curved structure with a specific curvature, and the bending state is maintained well, that is, the curvature is maintained stability which can further improve the serious problem of the Mura phenomenon. It should be noted that the cold bending processing in this embodiment refers to a forming method of bending a plate, that is, mechanically bending the plate into a profile of a certain shape and size at room temperature, and its product is called a cold bending profile.

In another embodiment, the processing of the curved display module may be implemented by a hot bending process.

The backplane 10 may be bent and formed by a die-casting process to facilitate processing into a curved structure with a specific curvature. The curvature of the backplane 10 is the same as the curvature of the cover plate 13 and the support member 12 to ensure the attachment yield and stability of the backplane 10 and the support member 12 to improve the severe Mura phenomenon.

Figure 9:
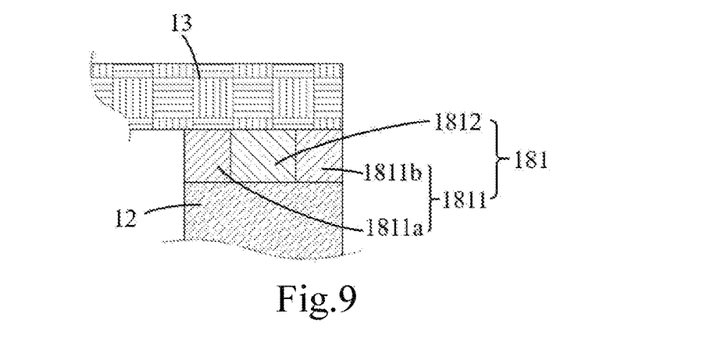
FIG. 9 is a partial enlarged view of a bonding portion of a display module according to an embodiment of the present application.

In an embodiment, as shown in FIG. 9, the second bonding layer 181 between the cover plate 13 and the supporting member 12 may include a first bonding portion 1811 and a second bonding portion 1812, and the first bonding portion 1811 and the second bonding portion 1812 both are located between the cover plate 13 and the support member 12 for bonding, that is, two opposite bonding surfaces of the first bonding portion 1811 are bonded to the cover plate 13 and the support member 12 respectively; and two opposite bonding surfaces of the second bonding portion 1812 are bonded to the cover plate 13 and the support member 12 respectively, so as to achieve the bonding between the cover plate 13 and the support member 12.

The elastic modulus of the second bonding portion 1812 is smaller than the elastic modulus of the first bonding portion 1811. A part of the structure of the second bonding layer 181 is made of a material with a small elastic modulus, so that the buffering capacity of the bonding layer can be increased, so as to alleviate the uneven stress between the cover plate 13 and the support member 12, Thereby, the Mura phenomenon is improved and the display effect is improved.

In an embodiment, as shown in FIG. 9, a liquid colloid such as a strong water glue S-OCR can be used as the second bonding portion 1812, which can not only increase the buffering capacity of the bonding layer to ease the uneven stress between the cover plate 13 and the support member 12 to improve the Mura phenomenon, but also can increase the overall bonding strength of the bonding layer because the strong water glue S-OCR has strong bonding performance, thereby ensuring the bonding stability between the cover plate 13 and the support member 12. It should be understood that, because the liquid colloid has fluidity, simply using strong water glue S-OCR to bond the cover plate 13 and the support member 12, especially in the curved screen module, is easy to cause the stress concentration of the curved surface, and the uniformity of the bonding thickness cannot be guaranteed. In order to avoid this problem, the first bonding portion 1811 of this embodiment may be made of solid colloid, for example, VHB double-sided adhesive. The solid adhesive may be disposed on an edge of the liquid colloid to control the thickness of the liquid colloid and play the role of sealant. Specifically, the first bonding portion 1811 may include a first solid glue 1811a and a second solid glue 1811b provided on the support member 12, the first solid glue 1811a, the second solid glue 1811b, the cover plate 13, and the support member 12 form a receiving cavity, and the liquid colloid can be filled in the receiving cavity to form the second bonding portion 1812.

An embodiment of the present application further provides a display device including the display module 1 described in any one of the foregoing embodiments. The display device may be a vehicle-mounted meter, a central control display device, a television, etc., but is not limited thereto.

The technical solution provided by the present application can achieve the following beneficial effects: the cover plate and the support member are bonded with a three-layer structure formed by adding a support member between the cover plate and the side frame, to ensure the strength of the cover plate and the original assembly process unchanged, and the support member is detachably connected to the side frame, shielding the impact of frequent disassembly on the upper glass cover plate 13 and ensuring separation of the cover plate 13 from the backplane 10, which facilitates the disassembly and repair of the display assembly 11 in the accommodation space after the failure.

The terms "a", "an", "the", and "said" are used to indicate the presence of one or more elements/constituents/etc.; the terms "include" and "having" are used to include open-ended inclusive means and means that there may be additional elements/components/etc. in addition to the listed elements/components/etc.; the terms "first", "second", etc. are only used as markers, not the limit number of their objects.

Those skilled in the art will readily contemplate other embodiments of the present application after considering the specification and practicing the invention disclosed herein. This application is intended to cover any variations, uses, or adaptations of this application. These variations, uses, or adaptations follow the general principles of this application and include common general knowledge or conventional technical means in the technical field not disclosed in this application. It is intended that the specification and examples be considered as exemplary only, with a true scope and spirit of the application being indicated by the following claims.

What is claimed is:

1. A display module, comprising:
   a backplane comprising a bottom plate and a side frame provided on the bottom plate;
   a display assembly located in the side frame and comprising a display panel;
   a support member located on a side of the side frame facing away from the bottom plate and detachably connected to the side frame; and
   a cover plate located on a side of the support member facing away from the side frame and bonded to the support member.

2. The display module according to claim 1, wherein the side frame comprises an extension portion provided outwardly, and the support member is detachably connected to the extension portion.

3. The display module according to claim 2, wherein the support member and the extension portion are connected by a bolt.

4. The display module according to claim 3, wherein a surface of the extension portion opposite to the support member is provided with a first mounting hole, and a surface of the support member opposite to the extension portion is provided with a second mounting hole, and the bolt passes through the first mounting hole and the second mounting hole respectively to connect the extension portion with the support member.

5. The display module according to claim 3, wherein a protrusion is provided on the surface of the extension portion opposite to the support member, and the support member is provided with a recess matching with the protrusion, and the protrusion is provided with a third mounting hole in a direction toward the display assembly, and an outer surface of the support member is provided with a fourth mounting hole, and the bolt passes through the fourth mounting hole and the third mounting hole respectively to connect the support member with the protrusion.

6. The display module according to claim 2, wherein the display module further comprises a circuit board, and the circuit board is disposed on a side of the bottom plate facing away from the display assembly, and the circuit board and the display assembly are connected through at least one flexible conductive member.

7. The display module according to claim 6, wherein the extension portion is provided with a first avoidance groove, and the support member is provided with a second avoidance groove, and an opening of the first avoidance groove faces an outside of the extension portion, and an opening of the second avoidance hole faces an inside of the support member.

8. The display module according to claim 1, wherein the display module is curved.

9. The display module according to claim 8, wherein the display panel and the cover plate are connected through a first bonding layer, and the cover plate and the support member are connected through a second bonding layer.

10. The display module according to claim 9, wherein the display assembly comprises a touch panel located between the display panel and the cover plate and attached to the display panel and the cover plate respectively by bonding.

11. The display module according to claim 9, wherein the first bonding layer is a liquid colloid.

12. The display module according to claim 11, wherein:
   the second bonding layer comprises a first bonding portion and a second bonding portion, and the first bonding portion comprises a solid colloid;
   the first bonding portion comprises a first solid glue and a second solid glue, and the first solid glue, the second solid glue, the cover plate and the support member form a receiving cavity; and
   the second bonding portion comprises a liquid colloid and is filled in the receiving cavity.

13. A display device, comprising:
   a display module, comprising:
      a backplane comprising a bottom plate and a side frame provided on the bottom plate;
      a display assembly located in the side frame and comprising a display panel;
      a support member located on a side of the side frame facing away from the bottom plate and detachably connected to the side frame; and
      a cover plate located on a side of the support member facing away from the side frame and bonded to the support member.

14. A method, comprising:
   providing a display module, the display module comprising:
      a backplane comprising a bottom plate and a side frame provided on the bottom plate;
      a display assembly located in the side frame and comprising a display panel;
      a support member located on a side of the side frame facing away from the bottom plate and detachably connected to the side frame; and
      a cover plate located on a side of the support member facing away from the side frame and bonded to the support member.

* * * * *

UNITED STATES PATENT AND TRADEMARK OFFICE
CERTIFICATE OF CORRECTION

PATENT NO. : 10,921,625 B1  
APPLICATION NO. : 16/814617  
DATED : February 16, 2021  
INVENTOR(S) : Yue Zhai et al.

Page 1 of 1

It is certified that error appears in the above-identified patent and that said Letters Patent is hereby corrected as shown below:

On the Title Page

Item (30), Column 1, in the "Foreign Application Priority Data" section, please delete:
"20111048098.7"
And replace with:
--201911048098.7--

Signed and Sealed this
Fifteenth Day of June, 2021

Drew Hirshfeld
*Performing the Functions and Duties of the
Under Secretary of Commerce for Intellectual Property and
Director of the United States Patent and Trademark Office*